United States Patent Office 2,876,493
Patented Mar. 10, 1959

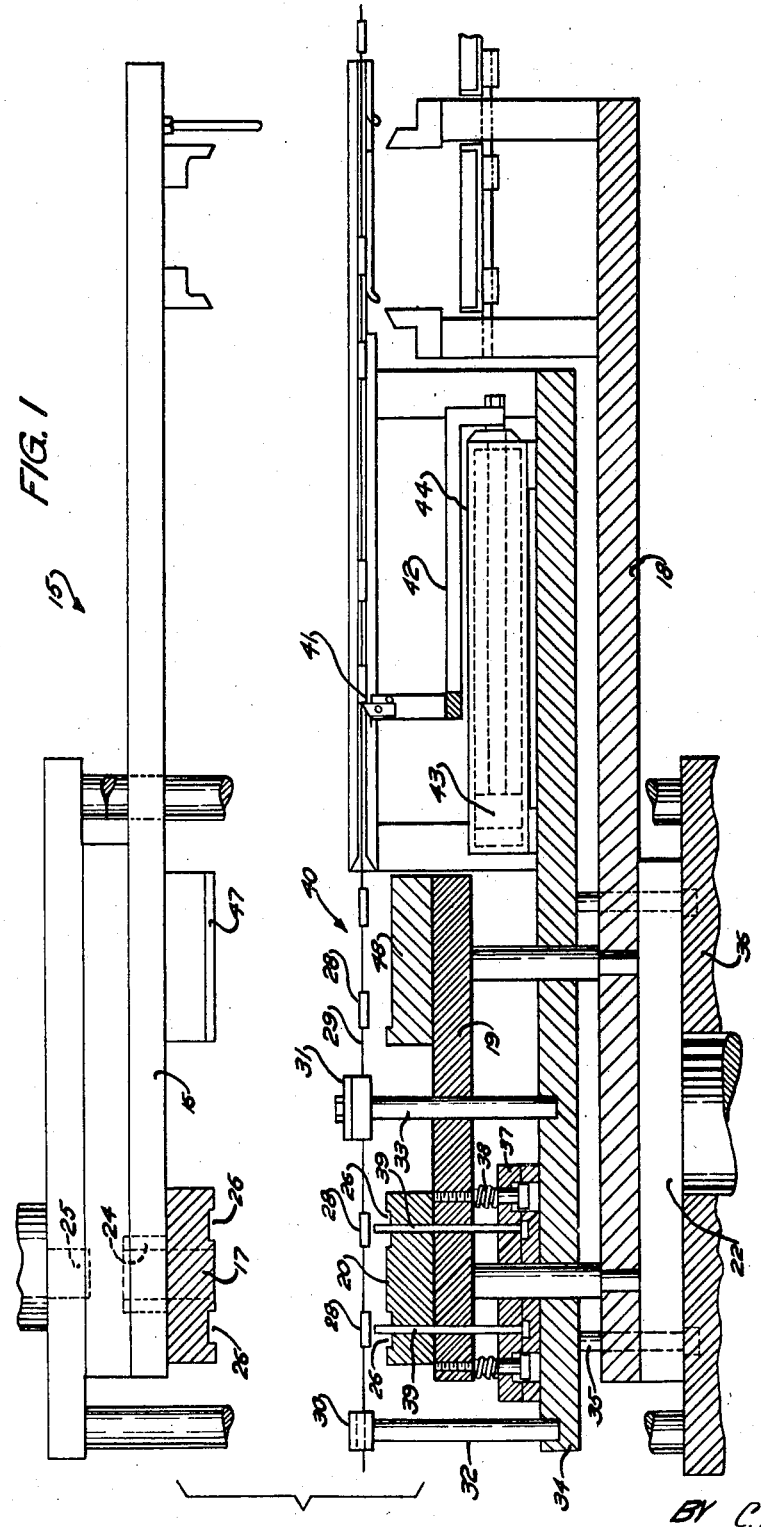

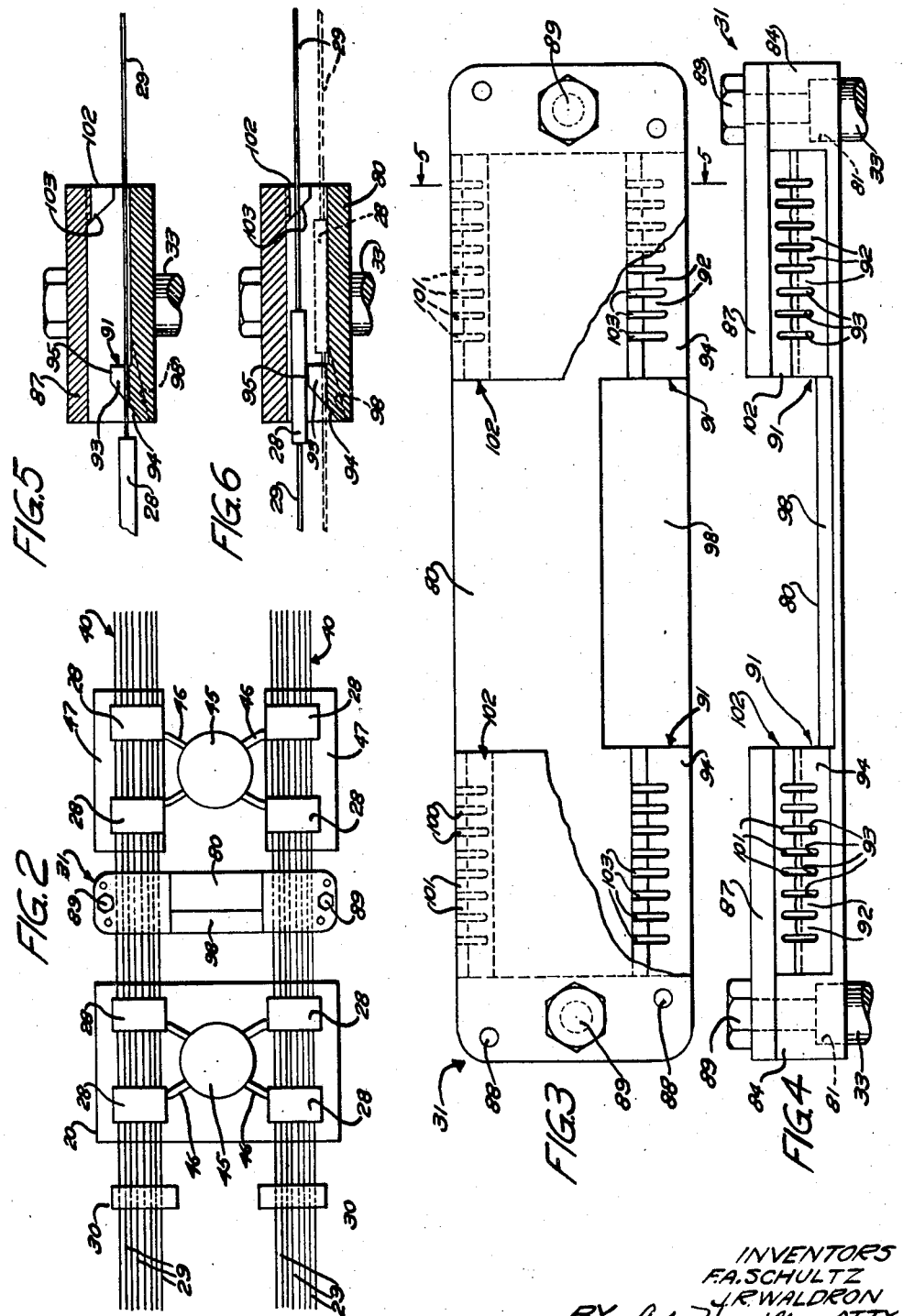

2,876,493

DEVICE FOR GUIDING WIRES HAVING PARTS ATTACHED THERETO

Frank A. Schultz, La Grange, and James R. Waldron, Chicago, Ill., assignors to Western Electric Company, Incorporated, New York, N. Y., a corporation of New York Application July 7, 1954, Serial No. 441,914

2 Claims. (Cl. 18—5)

This invention relates to a device for guiding wires with parts fixed thereto and more particularly to a device for guiding a plurality of wires into a mold for molding parts thereon and for guiding the wires and the parts from the mold.

An object of the invention is to provide a device for guiding wires having parts attached thereto in spaced relation to each other.

Another object of the invention is to provide a device for guiding a plurality of wires in predetermined relation to a die for molding parts thereon at longitudinally spaced intervals.

A device illustrating certain features of the invention as applied to a molding press for molding parts of insulating material onto a plurality of continuous parallel wires may include a first guide mounted on one side of a molding die and having a plurality of slots for maintaining the wires in a predetermined spaced relation to each other, and a second guide mounted on the other side of the molding die for passing the parts therethrough while maintaining the wires in said predetermined spaced relation and which second guide has a lower comb with teeth and slots extending upwardly for supporting the wires in a predetermined laterally spaced relation to each other at a predetermined normal level and which has an inclined surface engageable with the molded parts on the wire whereby the parts are guided thereover and cause the wires to be raised above and disengaged from the comb and then to drop down with the molded parts to their normal level as the wires and parts thereon are intermittently advanced. An upper comb on the second guide has teeth and slots extending downwardly at an elevation to engage the wires as they are raised by the cam surface of the lower comb and before they become disengaged therefrom for guiding the wires in said predetermined relation to the mold. The combs are spaced apart horizontally a distance greater than the length of the parts on the wire to permit the parts to move downwardly therebetween to their normal level as they ride off of the lower comb and as the wires re-enter the slots therein, and the upper comb has a sloping surface for camming the parts downwardly under the upper comb as the parts are advanced past it to insure that the parts are returned to their normal level in the event that the parts and the wires have not already done so.

Other objects and advantages of the invention will become apparent by reference to the following detailed description and the accompanying drawings illustrating a preferred embodiment thereof, in which Fig. 1 is a diagrammatic longitudinal sectional view of an apparatus for molding plastic parts onto a plurality of wires and showing the improved guide means associated therewith;

Fig. 2 is a fragmentary diagrammatic plan view of a portion of the apparatus and the wires and blocks mounted thereon;

Fig. 3 is an enlarged plan view of the guide device with portions broken away;

Fig. 4 is a front elevational view of the wire guide shown in Fig. 3; and

Figs. 5 and 6 are vertical sectional views taken along the line 5—5 of Fig. 3 showing the guide with the wires and the blocks mounted thereon in different positions.

Referring to the drawings, Fig. 1 shows diagrammatically a molding press 15 having an upper stationary platen 16 for supporting an upper heated die section 17, and a lower movable composite platen 18, including a plate 19 for supporting a lower heated die section 20. The lower platen is adapted to be reciprocated by a ram 22 to move the lower die section 20 to and from an upper position in engagement with the upper die section 17. A preform of plastic molding material is adapted to be deposited in an injection chamber 24 in the upper die section and a plunger 25 of a power actuated injector is adapted to force the plastic molding material into a plurality of mold cavities 26 formed in the die sections to mold a pair of blocks 28—28 on each of two spaced apart groups of parallel wires 29 fed thereinto. The wires 29 of each group are guided in a predetermined spaced relation to each other and in a predetermined alignment relative to the die cavities of the molding dies 17 and 20, by a pair of guides 30 and 31 disposed on opposite sides of the die. The guides 30 and 31 are fixed to the upper ends of supporting rods 32 and 33, respectively, which are carried by a knockout plate 34. During the latter part of the downward movement of the ram the knockout plate 34 is engageable with a plurality of stationary pins 35 carried by the bed 36 of the press for arresting the movement of the knockout plate 34 and effecting relative movement between the knockout plate and the lower platen 18 and the components carried thereby. An auxiliary knockout plate 37 suspended on a plurality of headed pins 38 on the plate 19 in a normal position spaced about one-half inch above the knockout plate 34 carries knockout pins 39 for ejecting the blocks 28 from the lower die section in response to relative movement between the knockout plate 34 and the die section 20 as they come to rest (Fig. 1). After the blocks 28 are ejected from the lower die section, the wires 29 are tensioned by means (not shown) to hold the blocks 28 above the knockout pins 39 and the lower die section 20 as the wires are advanced.

Successive pairs of blocks 28 are molded onto the wires 29 and the wires are intermittently advanced predetermined distances after each molding operation to form a continuous composite strip 40 which is adapted to be cut into sections to form relay components. A pivoted feed pawl 41 engageable with the blocks 28 is mounted on an arm 42 which is fixed to a reciprocable piston 43 for advancing the composite strip 40 of interconnected articles. The piston 43 is reciprocable through a predetermined distance within a cylinder 44 of a pneumatic actuator which is secured to the knockout plate 34 for vertical movement therewith.

The cull 45 and runners 46 adhering to the molded blocks 28 after the molding operation may be trimmed from the blocks by a trimming punch 47 and die 48 mounted on the stationary and movable platens 16 and 18, respectively.

The above-described apparatus is disclosed in the copending application on an article severing and discharging mechanism, Serial No. 419,828, filed March 30, 1954.

The wire guide 30 has a plurality of guide slots spaced apart predetermined distances for supporting and guiding the groups of wires 29 therethrough.

The guide 31 comprises a bottom plate 80 having shouldered apertures 81 for receiving the supporting rods 32 and having raised portions 84 at opposite ends thereof for supporting a pair of relatively short upper plates 87 thereon. The plates 87 are secured to the raised portions 84 by dowel pins 88 and locking screws 89 which serve to secure the wire guide 31 to the supporting rods 32. Adjacent each end of the lower plate 80 and adjacent the forward edge thereof, the plate 80 has a pair of lower combs 91 with teeth 92 and vertical wire guide slots 93 therebetween extending upwardly and spaced apart a predetermined distance corresponding to the spacing of the slots in the wire guide 31 for guiding the wires 29 in a predetermined laterally spaced relation to each other. Each of the combs 91 has a forwardly disposed sloping surface 94 which is adapted to engage the blocks 28 mounted on the wires and cam them upwardly onto the upper flat surface 95 thereof as the wires 29 and the blocks 28 are advanced through the guide. The lower surfaces of the upper plates 87 are spaced above the upper surface 95 of the comb 91 to provide ample clearance for the movement of the blocks 28 therebetween. The intermediate forward portion of the bottom plate 80 has a sloping surface 98 which serves to cam the cull 45 and the runners 46 upwardly onto the plate 80 as they pass through the guide 31 with the blocks 28 in the event that the cull has been deformed downwardly during the cooling of the plastic parts molded onto the wires. As the blocks are being cammed upwardly by the sloping faces 94 of the combs 91 onto the upper surfaces 95 thereof and before the wires 29 are elevated from the slots 93 thereof they move into downwardly extending slots 100 formed by downwardly extending fingers 101 of upper combs 102 formed on the upper plates 87. The upper combs 102 are spaced behind the lower combs 91 a distance sufficient to permit the blocks 28 to drop off of the lower combs onto the plate 80 before they engage the upper combs 102. Inclined sloping surfaces 103 formed on the forward portion of the upper combs serve to cam the blocks 28 downwardly in the event that they do not drop onto the plate 80. The lower edge of the comb 102 is spaced above the upper surface of the lower plate 80 a distance sufficient to provide ample clearance for the movement of the blocks 28 therethrough. It will thus be seen that the lower combs 91 in the guide 31 support the wires 29 at a predetermined normal level and in a predetermined laterally spaced relation to each other and also guide the blocks 28 up and over themselves and allow the blocks and the wires to drop back to their normal level as the composite strip 40 is intermittently advanced, and that a second comb 102 is positioned to engage the wires 29 before and while they are moved above the lower comb 91 to maintain them in the same laterally spaced relation to each other while the blocks 28 ride over the lower combs, and also to cam the blocks 28 downwardly to insure that the blocks and the wires 29 are returned to their normal level in the event that they have not already done so.

Thus, the above-described arrangement of wire guides 30 and 31 serves to guide the wires 29 in a predetermined laterally spaced relation to each other and to the molding die 17, 20 as they are intermittently advanced and the guide 31 permits the blocks 28 to pass therethrough while maintaining the wires 29 in proper alignment with the molding die.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus having a pair of cooperable dies for molding successive relatively thin parts in spaced relation to each other onto a plurality of parallel wires intermittently advanced longitudinally between the dies, a first guide means mounted on one side of the dies for supporting the wires for movement toward the dies, a second guide means mounted on the other side of said dies and cooperable with said first guide means for supporting the wires in parallel and predetermined spaced relation to each other and to the dies and for longitudinal movement of the wire and the parts molded thereonto from the die, said second guide means comprising a lower guide member and an upper guide member mounted on opposite sides of the wires and spaced apart from each other a distance at least equal to the longitudinal dimension of the part and disposed vertically with the upper portion of the lower guide member and the lower portion of the upper guide member at least touching a common plane parallel to the movement of the wires, said lower guide member having grooves therein extending downwardly into the upper portion thereof for supporting the wires in said parallel and predetermined spaced relation to each other and with the molded part thereon disposed at a level below that of the lower portion of said upper guide member, said lower guide member having a surface sloping rearwardly and downwardly from said upper portion to a region below said grooves for engaging the molded parts and guiding them upwardly onto the upper portion of and over said lower guide member, and said upper guide member having grooves extending upwardly into the lower portion thereof in longitudinal alignment with the grooves in the lower guide member for receiving the wires therein when they are raised out of the grooves in the lower guide member to maintain them in said predetermined aligned relation to the dies.

2. In an apparatus having a pair of cooperable dies movable vertically to open and closed positions for molding relatively thin parts successively in spaced relation to each other onto a plurality of parallel wires which are intermittently advanced longitudinally and horizontally between the open dies, a first guide means and a second means disposed on opposite sides of the dies for supporting and guiding the wires in parallel and predetermined spaced relation to each other and to the dies, said second guide means comprising a lower guide member disposed under the wires and an upper guide member disposed over the wires and spaced apart longitudinally of the wires a distance at least equal to the longitudinal dimension of the molded part, the lower guide member having a top surface and the upper guide member having a bottom surface and the upper and the lower guide members being positioned vertically so that at least said top and said bottom surfaces touch a common horizontal plane, said lower guide member having a plurality of grooves extending vertically downwardly from said top surface for supporting the wires for longitudinal movement with the parts on the wires disposed beneath said lower surface of the upper guide member, said lower guide member having a surface sloping downwardly and rearwardly from said top surface past the grooves therein and engageable with the molded parts for guiding them upwardly onto the top surface of and over the lower guide member as the wires and parts thereon are intermittently advanced, said upper guide member having grooves extending vertically upwardly from said bottom surface in longitudinal alignment with the grooves in the lower guide member for receiving the wires when they are raised out of the grooves in the lower guide member, said upper guide member having a surface sloping from said bottom surface upwardly and rearwardly and engageable with the molded parts on the wires for guiding the parts downwardly under the upper guide member.

References Cited in the file of this patent

UNITED STATES PATENTS

| 2,369,291 | Frank | Feb. 13, 1945 |
| 2,568,771 | Smith | Sept. 25, 1951 |
| 2,577,584 | Hofreiter | Dec. 4, 1951 |